United States Patent [19]

Blanke

[11] Patent Number: 5,342,065

[45] Date of Patent: Aug. 30, 1994

[54] INFLATABLE SEAL ARRANGEMENT

[75] Inventor: Hans-Jürgen Blanke, Seefeld, Fed. Rep. of Germany

[73] Assignee: Klüber Lubrication München KG, Munich, Fed. Rep. of Germany

[21] Appl. No.: 898,518

[22] Filed: Jun. 15, 1992

[30] Foreign Application Priority Data

Jun. 18, 1991 [DE] Fed. Rep. of Germany ....... 4119954

[51] Int. Cl.⁵ ............................................. F16J 15/46
[52] U.S. Cl. ..................................... 277/34; 277/152; 277/201; 277/202
[58] Field of Search ................ 277/34, 34.3, 38, 40, 277/42, 88, 95, 96.1, 152, 201, 202, 226

[56] References Cited

U.S. PATENT DOCUMENTS

| | | | |
|---|---|---|---|
| 2,177,441 | 10/1939 | Pesarese | 277/152 |
| 2,863,681 | 12/1958 | Robbins . | |
| 2,990,201 | 6/1961 | Stephens | 277/95 X |
| 3,064,982 | 11/1962 | Stephens | 277/95 |
| 3,815,926 | 6/1974 | Vore | 277/34 |
| 4,045,035 | 8/1977 | Lecordier | 277/34.3 |
| 4,198,064 | 4/1980 | Huhn | 277/152 |
| 4,401,306 | 8/1983 | Arnold | 277/34.3 |

FOREIGN PATENT DOCUMENTS

| | | | |
|---|---|---|---|
| 266268 | 11/1987 | Japan | 277/152 |
| 813050 | 3/1981 | U.S.S.R. | 277/152 |
| 576206 | 3/1946 | United Kingdom | 277/226 |
| 850767 | 10/1960 | United Kingdom | 277/201 |

*Primary Examiner*—William A. Cuchlinski, Jr.
*Assistant Examiner*—Scott W. Cummings
*Attorney, Agent, or Firm*—Kenyon & Kenyon

[57] ABSTRACT

A seal arrangement for the gap between a surface of an element rotating around its axis which is to be sealed, and a seal carrier at a distance from it. The seal arrangement includes a sealing ring of a polymeric material, which is at least partially surrounded by the seal carrier in the region of a holder segment and is connected with it so as not to rotate. The sealing ring touches the surface with a lip segment pressed on it in an elastic manner; the sealing ring has at least one ring segment which is expandable by means of a medium to which pressure can be applied, and is pressed against the surface. The ring segment of the sealing ring is arranged at least partially outside of the region of the holder segment surrounded by the seal carrier.

16 Claims, 3 Drawing Sheets

INFLATABLE SEAL ARRANGEMENT

The present invention relates to a seal arrangement for the gap between an element rotating around its axis and a seal carrier at a distance from the element. The invention comprises a sealing ring of a polymeric material, which is at least partially surrounded by the seal carrier in the region of a holder segment and is connected with the seal carrier so as not to rotate. The sealing ring touches the surface of the rotating element with a lip segment pressed on the rotating element in an elastic manner. The sealing ring has at least one ring segment which is expandable by means of a pressurized medium which allows the sealing ring to be pressed against the surface of the rotating element.

A seal arrangement is known from U.S. Pat. No. 2,863,681. This seal is used to seal the region on the circumference of a tube-shaped hollow element. The seal consists of a seal carrier arranged concentric to the surface to be sealed and spaced at a radial distance, in Which an expandable tube-shaped seal is arranged. The seal carrier has a circular cross-section and has a recess in the direction of the shaft to be sealed. When pressure is applied to the expandable seal, the latter lies against the inside surface of the seal carrier under radial stress, and touches the shah to be sealed with a sealing lip, along the sealing surface. However, in this device the tube-shaped seal is subject to great mechanical stress in the area where the recess of the seal carrier meets the seal. This stress can cause rupturing of the seal, making the performance unsatisfactory, especially during long periods of use. Also, the ability to influence the amount of pressure of the seal on the shaft to be sealed is limited, due to the structure of the sealing lip.

Seal arrangements are known which are used in face seals for gear crowns and rotating elements and their casings on rotating tubes such as ball mills. These seal arrangements take advantage of the use of a sealing ring of a polymeric material attached to the seal carrier so as not to move. The seal is engaged with a face which extends perpendicular to the axis of a bearing surface on the rotating part formed parallel to the axis. The sealing achieved in this device is not very satisfactory. In this device, it is of particular significance that for large diameter rotating elements and gear crowns, e.g. of diameters of more than 5 meters, it is generally not possible to guarantee the rotation symmetry of the sealing surfaces necessary to achieve a good sealing result. It is also not possible to sufficiently compensate for back and forth movement of the sealing surface parallel to the axis during rotating movement.

The present invention is based on the need to develop a seal arrangement that has better operational properties during an extended lifetime. The present invention achieves this result, even when the surfaces to be sealed are of large diameter, and even when back and forth movements and tumbling movements of the component to be sealed occur during operation.

The above results are accomplished, according to the present invention, with a seal arrangement in which the ring segment of the sealing ring is arranged at least partially outside of the holder segment surrounded by the seal carrier. In this arrangement, it is advantageous that the ring segment of the sealing ring and the seal carrier are arranged relative to one another in such a way that wear in the region of the holder segment of the sealing ring is reduced, so that better operational properties are obtained over a longer period of use. In the present invention the mechanical stress in this region is reduced, even though frequent pressure changes occur in the ring segment and the component to be sealed may be eccentrically displaced relative to the lip segment of the sealing ring. This allows the seal arrangement to be used for reliable sealing of surfaces with large diameters, surfaces which are unbalanced during use, or tumbling surfaces.

To achieve the above results, it is necessary that the pressurized medium is compressible; compressed air can be used, for example.

It is particularly easy to produce the sealing ring of the present invention if the holder segment and the lip segment are produced in one piece from an elastic seal material, for example rubber. In addition to particularly good durability, this construction makes it possible to eliminate subsequent joining of separately produced parts.

Within the scope of the present invention, the lip segment can be formed by at least two seal lips which delimit a cavity with the surface to be sealed, and this cavity can be filled with barrier grease. This structure results in reliable sealing of the space to be sealed and very slight wear of the sealing lips forming the lip segment, which makes it possible to achieve an even longer useful life.

In the simplest configuration, the lip segment can have only a single sealing lip with an outer profile that extends parallel to the axis or encloses a small angle of less than 15° with the axis. A negative angle should be avoided, because axial crushing of the sealing lip onto itself could result, and this would make the lip segment unsuitable for equalizing relative movements of the face.

The sealing ring can be provided with armoring in at least part of the area of the holder segment, so that relaxation phenomena of the sealing ring during use are reduced.

In one embodiment of the present invention, the ring segment is arranged so that it is entirely outside the region surrounded by the seal carrier and has an oval cross-section. In this embodiment, the largest expanse of the cross-section extends parallel to the surface to be sealed so that when pressure is applied to the ring segment it is possible to achieve easy and precise deformation of the ring segment in the direction of the surface to be sealed. The ring segment has an opening through which a pressurized medium can be fed. Within the ring segment, an elastic spring element can be inserted. This spring element exerts stress in the direction in which the ring is to press.

In another embodiment, the ring segment is arranged at least partially in the holder segment and the holder segment is held at least partially movable in a non-resilient guide groove in the seal carrier. This guide groove extends parallel to the axis and surrounds the axis concentrically. As a result, the lip segment is able to follow back and forth movements of the face, or partial regions of the face, parallel to the axis during use, without any changes in the reciprocal orientation between the profile of the sealing lip and the profile of the sealing surface taking place. This arrangement makes it easy to achieve good sealing.

The lip segment can be pressed against the surfaces to be sealed by the inherent elasticity of the ring segment. In order to guarantee uniform pressure of the lip segment against the surface, even when large relative movements of the surface occur in the axial direction, it is advantageous to provide secondary means for pressing the lip segment down. This can be, for example, a mechanical, hydraulic or pneumatic type mechanism.

When the lip segment is pressed down by a secondary means, which can use a flowable medium to which pressure is applied, it is advantageous if the secondary means surrounds a ring segment enclosed by the holder segment. The pressure can be applied to the medium in the ring segment and the holder segment is formed to be expandable within the axial expanse of the ring segment, parallel to the axis. This structure avoids any leakage losses and allows adjusting of the pressure of the sealing lips against the surface, via the pressure of the flowable medium in the ring segment. This configuration achieves optimum results with regard to useful lifetime and with regard to sealing.

Uniform pressure of the sealing lips against the surface over the surface's entire circumference can be guaranteed if the ring segment surrounds the axis concentrically over the entire circumference. Deviations of the surface relative to rotation symmetry therefore are compensated for.

The surface to be sealed can have a diameter which expands in the direction of the seal carrier, forming the shape of a hollow cone, and the lip segment can have at least one sealing lip, the profile of which encloses a smaller angle with the axis than the angle formed by the surface to be sealed.

Because the sealing lip, which surrounds the axis concentrically, is pressed down parallel to the axis against the hollow cone surface a force directed radially inwardly occurs in the sealing lip, and this force is distributed evenly in the circumferential direction. Because of this, the axial pressure of the sealing lip against the surface can be adjusted to a value which promotes the achievement of an optimum, sealing result with particularly low, specific material stress, while avoiding excess local stress on the polymeric material which forms the sealing lip. As a result, good shape retention over extended periods of time is guaranteed. The sealing result achieved is thus significantly improved.

It is desirable that the surface has a profile which encloses an angle A of 30° to 60°—preferably 40° to 50°—with the seal axis. In the latter range, good guidance of the sealing lip is achieved and friction wear is reduced to a minimum.

Good proportionality between the pressure of the flowable medium fed into the ring segment, and the pressure force of the sealing lips against the surface in the axial direction, is achieved if the holder segment is structured in the form of two folded bellows which surround the ring segment. In addition to the improved flexibility due to the reduction in wall thickness, this configuration improves flexibility because of the reduction in the size of the contact surfaces between corresponding regions of the holder segment and the guide groove. The reduction in size of these surfaces result in a reduction in friction losses.

The ring segment can be produced using a melt core process. More cost-effective production is possible if the holder segment is provided with a split in its profile which extends parallel to the axis, and the shanks of the profile which lie opposite one another in the region of the split are placed against one another to form a seal. The use of a melt core is not necessary in the production of a sealing ring with such a split. In such an embodiment, the shanks can be glued or welded to one another in the region of the division, in order to preclude the occurrence of leaks and to simplify assembly.

Good operational reliability in the present invention is achieved if the end of the holder segment facing away from the lip segment is fixed in place in the guide so as not to move. To achieve this result, the seal carrier can be penetrated by openings which extend perpendicular to the axis and are spaced at regular intervals on the circumference. Mechanical aids, for example locking bolts and/or spacer sleeves, are provided which engage the openings to lock the holder segment in place in the guide groove. After wear has occurred, the sealing ring can be easily replaced with a new sealing ring, if such an attachment mechanism is provided.

The invention will be explained further, on the basis of the drawings. In the drawings.

Figure 1:
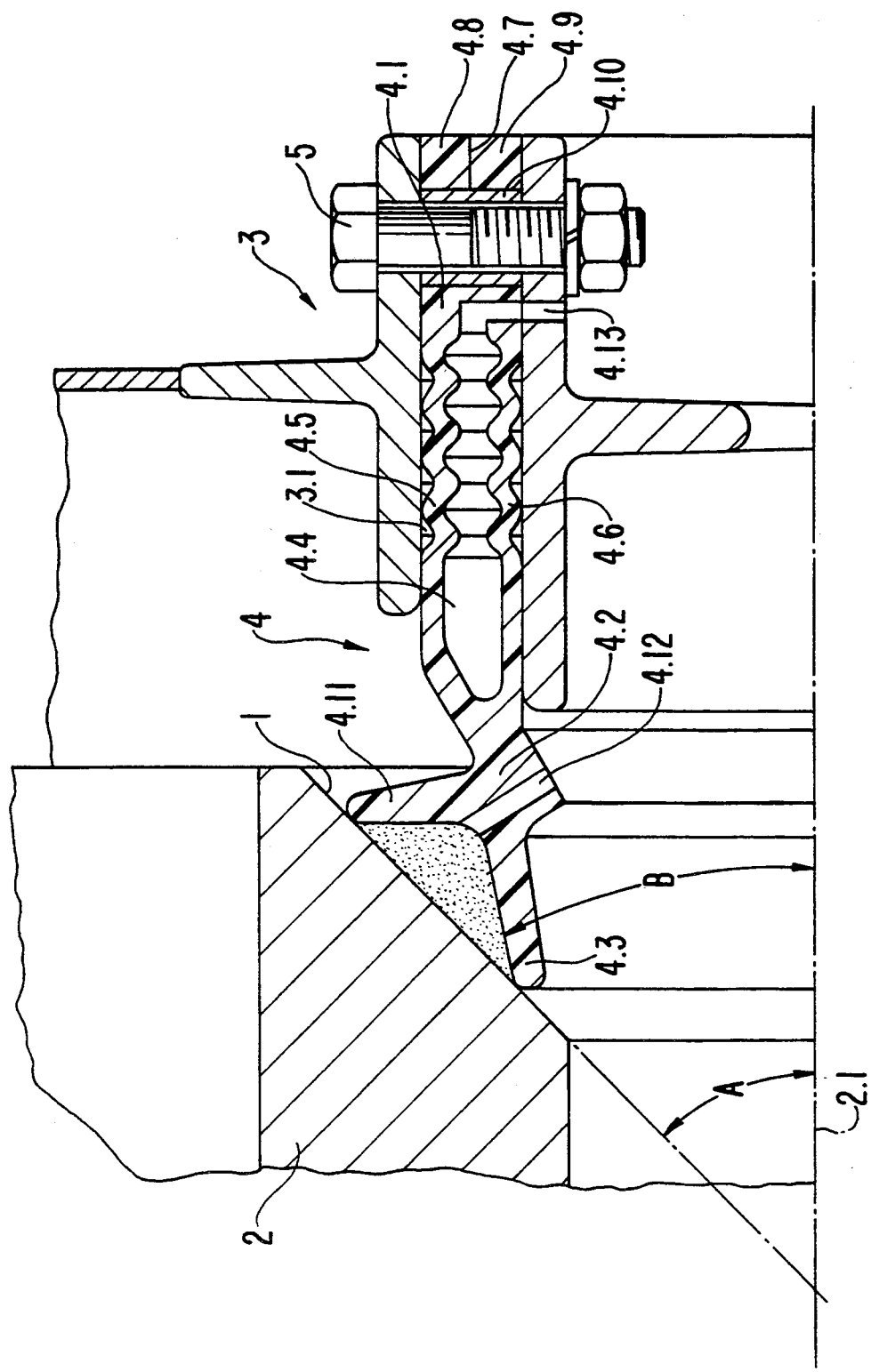
FIG. 1 shows a first embodiment of the present invention.

In FIG. 1, the sealing gap between the face 1 of a hollow element 2 rotating around its axis 2.1 and a seal carrier 3 at a distance from the hollow element in the axial direction is shown in partial cross-section. The arrangement for sealing this gap comprises a sealing ring 4 of a polymeric material, which is attached by means of a holder segment 4.1 to the seal carrier 3 so as not to rotate. The sealing ring 4 touches the face 1 with a lip segment 4.2 pressed onto the element 2 in an elastic manner. The face 1 is structured as a hollow cone and has a diameter which expands in the direction of the seal carrier 3. The profile of the face 1 encloses is at an angle A of 45° with the seal axis 2.1.

The lip segment touches the face 1, on the side facing radially inwardly, with a sealing lip 4.3. This lip 4.3 has a profile on the outside which encloses an angle B of about 12° with the axis 2.1. Radially outside the sealing lip 4.3 a single additional lip 4.11 is provided, which rests against the face 1. The space between the additional lip 4.11 and the sealing lip 4.3 is filled with a barrier grease which acts as a lubricant and a seal. In order to be able to supplement the supply of this grease as needed, a bore 4.12 is provided, which penetrates the lip segment 4.2 at several circumferential locations.

The lip segment 4.2 is produced in one piece with the holder segment 4.1 of the sealing ring 4, and is made of rubber or any other elastic material. The holder segment 4.1 is held in a guide groove 3.1 of the seal carrier 3, and is provided with a ring segment 4.4 which concentrically surrounds the axis 2.1. The ring segment 4.4 holds a flowable medium to which pressure can be applied, which is fed through a bore 4.13. The holder segment 4.1 encloses the ring segment 4.4, and is structured in the form of two folded bellows 4.6, 4.5. These bellows 4.6, 4.5 allow expansion in a direction parallel to the axis 2.1. Radial deflection is prevented by the components of the seal carrier 3 which define the guide groove 3.1. These components are rounded off at their edges so that if the sealing ring 4 is displaced toward the edges, damage to the sealing ring will be prevented.

The holder segment 4.1 is provided with a split 4.7 of its profile which extends parallel to the axis 2.1, on the side of the ring segment 4.4 facing away from the lip segment 4.2. This split is constructed at the time of production. The shanks 4.8, 4.9 of the profile, which lie opposite one another in the region of the split, are glued or welded together to form a seal. Both shanks are penetrated by bores and spaces sleeves 4.10 distributed uniformly around the circumference, and which extend through the seal carrier 3, through which pass retainers 5, which are formed by locking screws and spacer sleeves 4.10. The end of the holder segment 4.1 facing away from the lip segment in the axial direction is held in place, so as not to move, in the guide 3.1 of the seal carrier 3 on the far side of the ring segment 4.4. As a result, the seal member 4 cannot rotate relative to the seal carrier during use, nor can it fall out of the guide groove 3.1.

To produce the pressure of the lip segment 4.2 against the face 1 required to achieve good sealing, a flowable medium to which pressure can be applied, for example compressed air, is fed into the ring segment 4.4 via a bore 4.13. The ring segment 4.4 surrounds the axis 2.1 concentrically along the entire circumference. This arrangement results in completely uniform pressure of the lip segment 4.2 against the face 1 along its circumference. Relative deviations of the rotation symmetry of the face 1 and the seal carrier 3 are automatically equalized by this arrangement.

Figure 2:
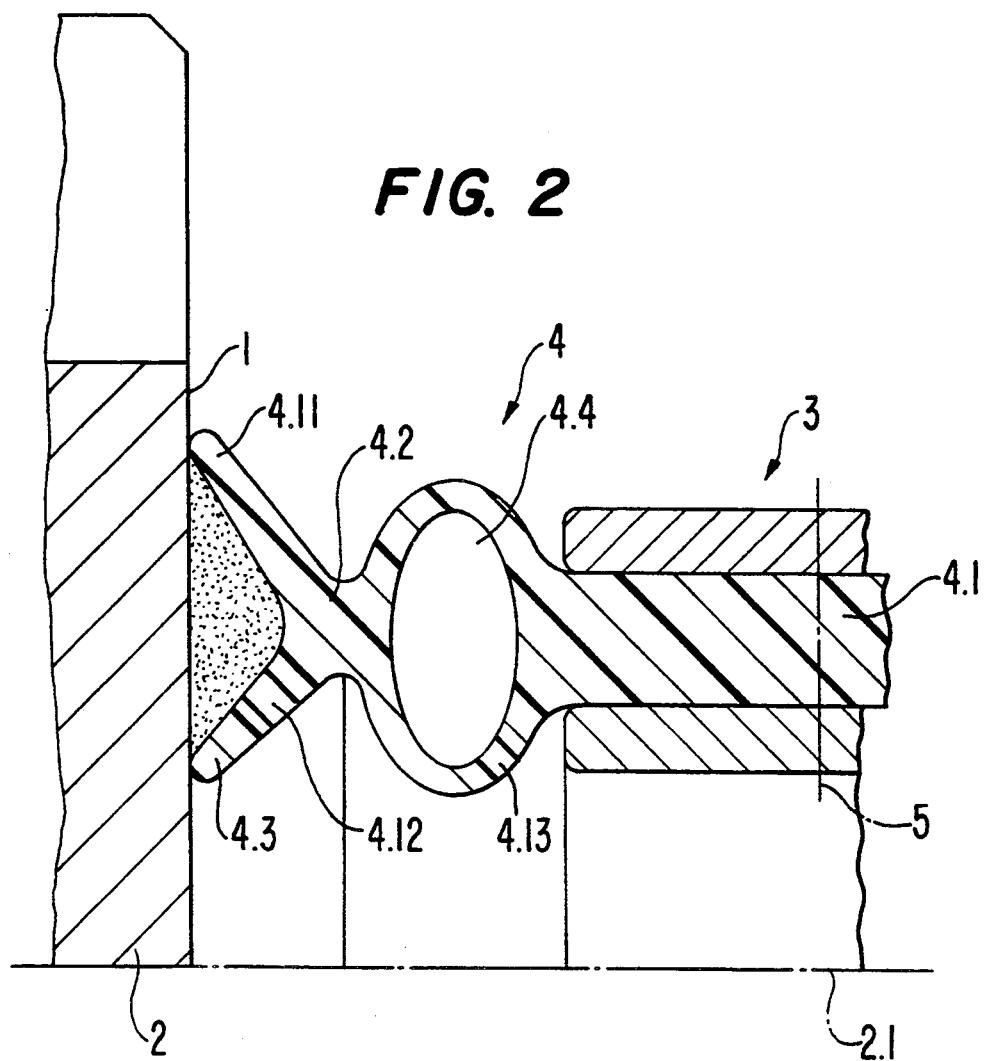
FIG. 2 shows a second embodiment of the present invention.
Figure 3:
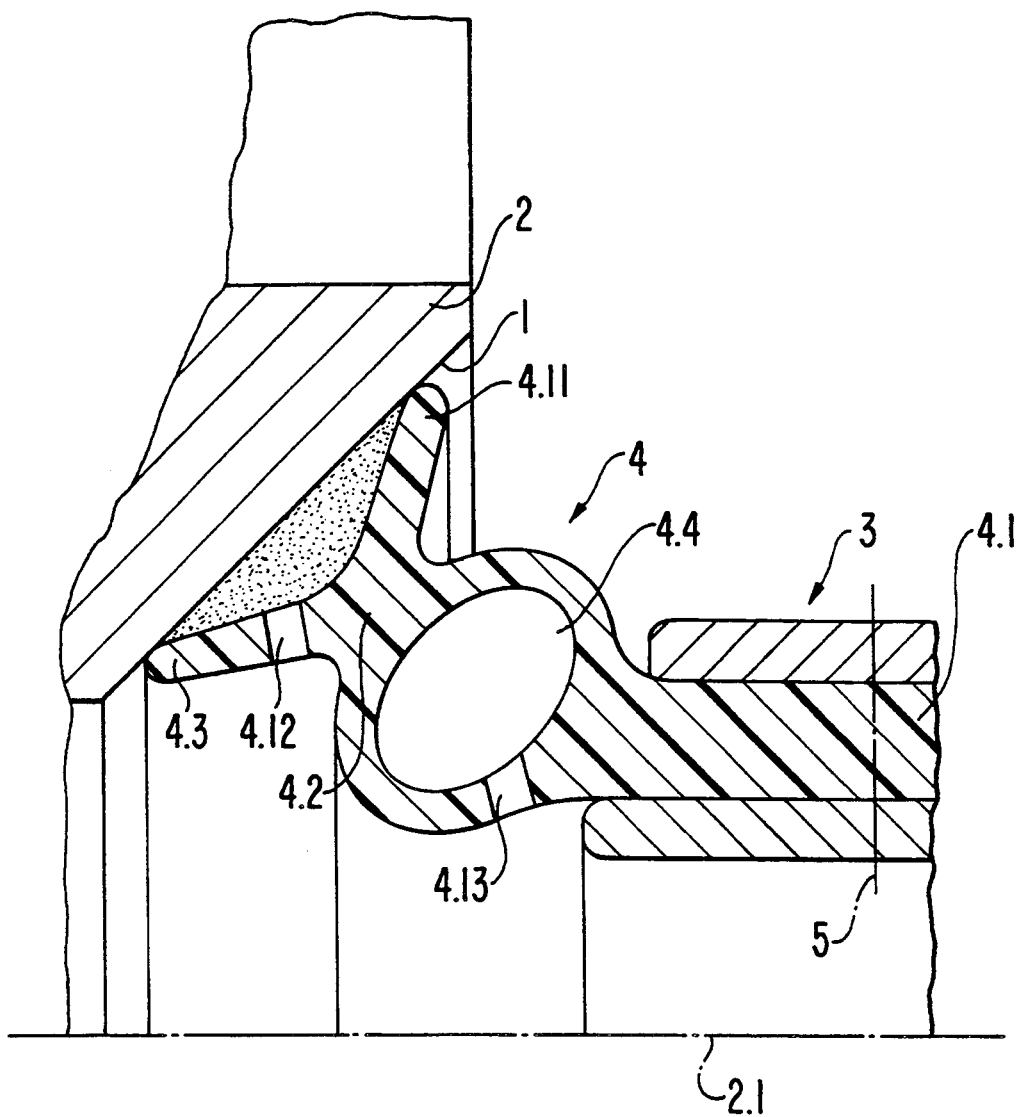
FIG. 3 shows a third embodiment of the present invention.

In FIGS. 2 and 3, two embodiments are shown where the seal ring has a different structure than that shown in FIG. 1. The function of the seal arrangement is essentially the same as the function described for FIG. 1. The ring segment 4.4 is arranged completely outside the seal carrier 3 in FIGS. 2 and 3. The holder segment 4.1 is structured without axial passages and is held in the seal carrier 3. The seal carrier 3 is rounded in the region of its edges, at least at the sides facing towards the sealing ring, so that in the case of displacements of the component to be sealed and subsequent deflection movements of the sealing ring, no damage will occur to the sealing member. As in FIG. 1, the lip segment 4.2 consists of two sealing lips 4.3, 4.11, of which the sealing lip 4.11 is structured as an additional lip. The lip segment 4.2 forms a cavity with the surface to be sealed, which cavity is filled with grease. The oval shape of the ring segment results in particularly easy and precise adjustment of the pressure of the sealing ring 4 against the surface 1 to be sealed.

The seal arrangement according to the invention is characterized by particularly good durability and reliability. It is therefore particularly suited for applications in which these results are important factors, along with the need to achieve good sealing.

I claim:

1. A seal arrangement for an element rotating around its axis comprising;
   a seal carrier spaced from said element; and
   an elastic sealing ring at least partially surrounded by said seal carrier, said sealing ring comprising:
   a holder segment connecting said sealing ring to said seal carrier so said sealing ring does not rotate;
   at least one ring segment which is expandable by means of a pressurizable medium in a direction toward said element, at least part of said ring segment extending outside an area within the seal carrier, said pressurizable medium being sealed within said ring segment to thereby prevent leakage losses; and
   at least one lip segment connected to said ring segment and contacting said element to thereby seal said element;
   no portion of said seal carrier being located between said ring segment and said element, whereby upon expansion of said ring segment, said ring segment expands in a direction away from said seal carrier.

2. The seal arrangement according to claim 1, wherein:
   said pressurizable medium is a compressible fluid.

3. The seal arrangement according to claim 1, wherein:
   the holder segment and the lip segment are constructed in one piece from an elastic seal material.

4. The seal arrangement according to claim 3, wherein:
   the lip segment comprises at least two seal lips which define, with an outer surface of said element, a cavity.

5. The seal arrangement according to claim 4, wherein:
   the cavity is filled with barrier grease.

6. The seal arrangement according to claim 1, further comprising:
   armoring in the sealing ring in at least part of the region of the holder segment.

7. The seal arrangement according to claim 1, wherein:
   the ring segment has an oval cross-section and is arranged completely outside of the area within the seal carrier.

8. The seal arrangement according to claim 1, further comprising:
   openings penetrating the holder segment, extending perpendicular to an axis of the element, and spaced at regular intervals on the circumference of the holder segment; and
   mechanical aids which engage the openings to lock the holder segment in place in the seal carrier.

9. The seal arrangement according to claim 8, wherein:
   the mechanical aids are locking bolts and spacer sleeves.

10. A seal arrangement for an element rotating around its axis comprising:
    a seal carrier spaced from said element; and
    an elastic sealing ring at least partially surrounded by said seal carrier, said sealing ring comprising:
    a holder segment connecting said sealing ring to said seal carrier so said sealing ring does not rotate;
    at least one ring segment which is expandable by means of a pressurizable medium, at least part of said ring segment extending outside an area within the seal carrier; and
    at least one lip segment connected to said ring segment and contacting said element to thereby seal said element,
    wherein the ring segment is arranged at least partially within the holder segment and the holder segment is at least partially movable in a non-resilient guide groove in the seal carrier, said guide groove extending substantially parallel to the axis of said element and concentrically surrounding said axis.

11. The seal arrangement according to claim 10, wherein:
    the holder segment comprises two folded bellows which surround the ring segment.

12. The seal arrangement according to claim 10, wherein:

the holder segment includes a split which extends substantially parallel to the axis of the element on the side of the holder segment facing away from the lip segment, the split forming shanks in the holder segment, the shanks lying opposite one another and touching one another during use.

13. The seal arrangement according to claim 12, wherein:

the shanks are adhesively secured to one another in the area of the split.

14. The seal arrangement according to claim 12, wherein:

the shanks are welded to one another in the area of the split.

15. A seal arrangement for an element rotating around its axis comprising:

a seal carrier spaced from said element;

said element having a sealing surface at a first angle to an axis of said element, the sealing surface having a diameter which expands as it nears said seal carder to form the shape of a hollow cone; and an elastic sealing ring at least partially surrounded by said seal carrier, said sealing ring comprising:

a holder segment connecting said sealing ring to said seal carrier so said sealing ring does not rotate;

at least one ring segment which is expandable by means of a pressurizable medium, at least part of said ring segment extending outside an area within the seal carrier; and at least one lip segment connected to said ring segment and contacting said element to thereby seal said element, said lip segment comprising at least one sealing lip, the at least one sealing lip extending at a second angle to the axis of said element, said second angle being smaller than said first angle.

16. The seal arrangement according to claim 15, wherein:

the first angle is between 30° and 60°.

* * * * *

UNITED STATES PATENT AND TRADEMARK OFFICE
CERTIFICATE OF CORRECTION

PATENT NO. : 5,342,065
DATED : August 30, 1994
INVENTOR(S) : Hans-Jurgen BLANKE

It is certified that error appears in the above-indentified patent and that said Letters Patent is hereby corrected as shown below:

Column 1, line 22, "Which" should be --which--;
Column 1, line 27, "shah" should be --shaft--;
Column 5, line 2, "spaces" should be --spacer--;
Column 5, line 5, "screws" should be --bolts--;
Column 5, line 11, ". nor" should be --nor--; and
Column 8, line 1, "carder" should be --carrier--.

Signed and Sealed this

Eleventh Day of April, 1995

Attest:

BRUCE LEHMAN

*Attesting Officer*     *Commissioner of Patents and Trademarks*